W. G. PRICE.
BRAKE BEAM SUPPORT.
APPLICATION FILED SEPT. 30, 1910.
1,028,386.
Patented June 4, 1912.
2 SHEETS—SHEET 1.
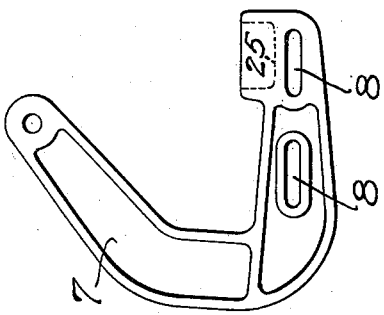
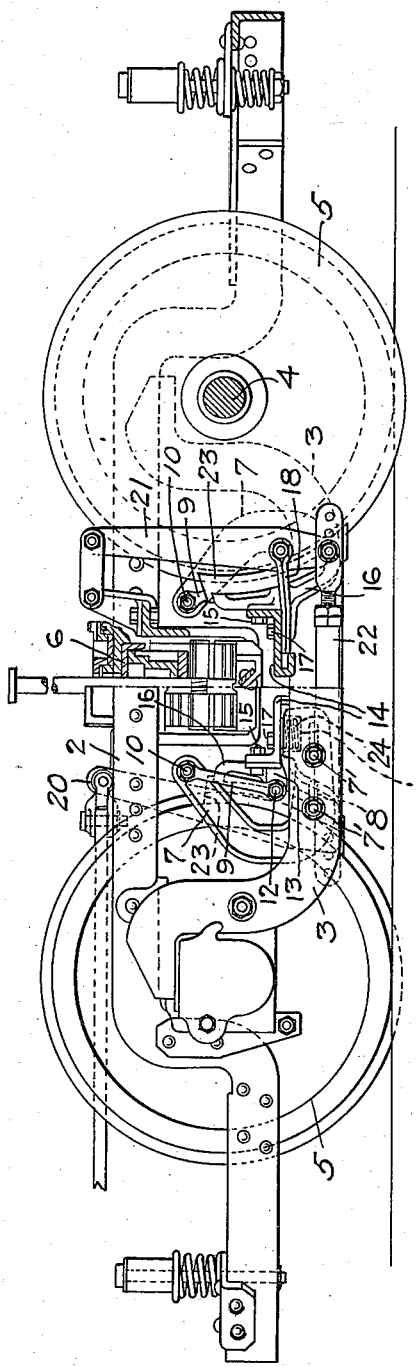
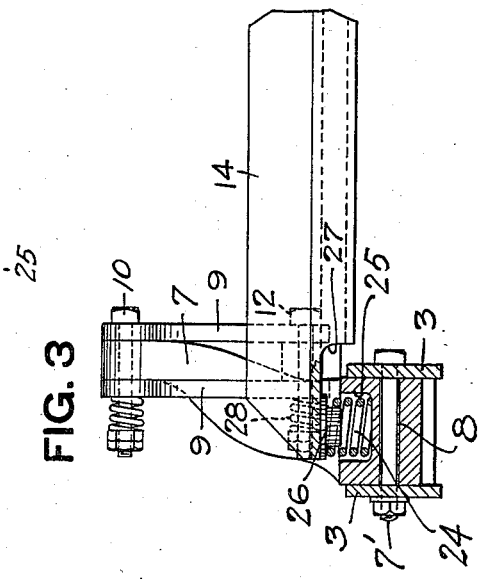
WITNESSES.
J. R. Keller
Robert C. Totten
INVENTOR:
William Gunn Price
By Kay & Totten
attorneys

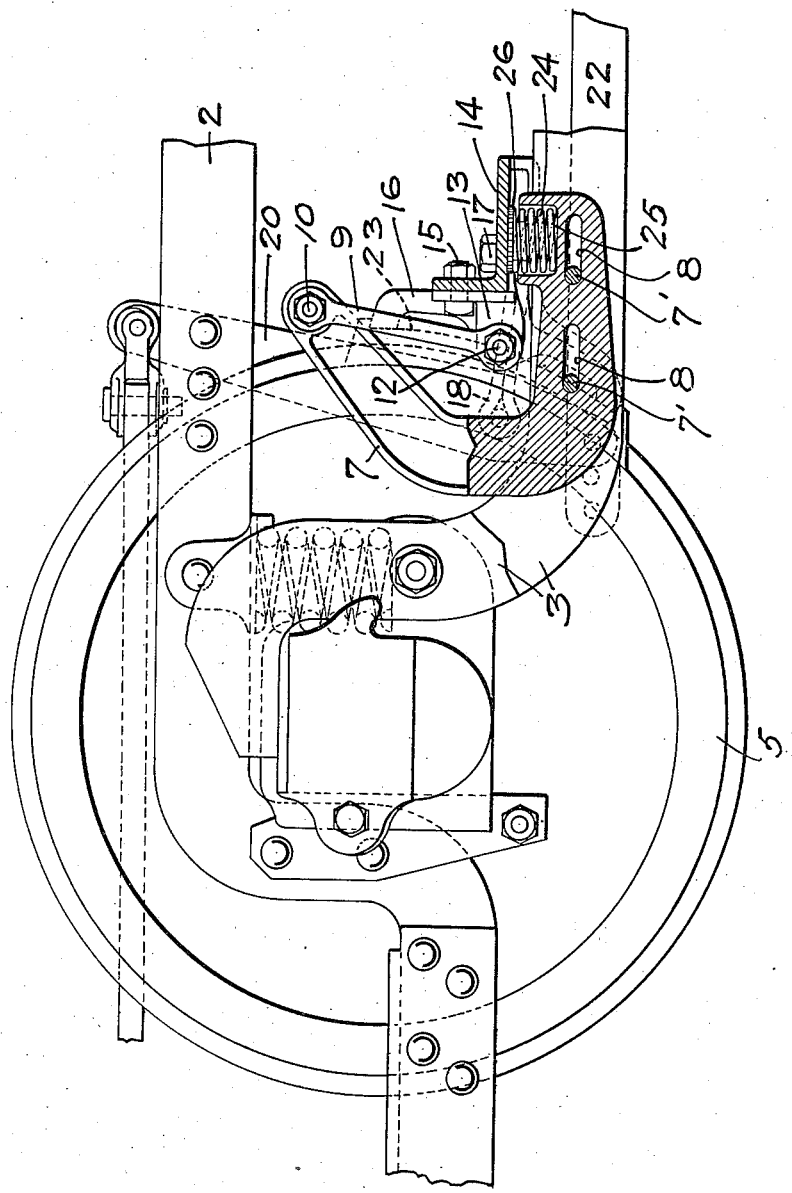

UNITED STATES PATENT OFFICE.

WILLIAM GUNN PRICE, OF NEW CASTLE, PENNSYLVANIA.

BRAKE-BEAM SUPPORT.

1,028,386.  Specification of Letters Patent.  Patented June 4, 1912.

Application filed September 30, 1910. Serial No. 584,744.

*To all whom it may concern:*

Be it known that I, WILLIAM GUNN PRICE, a resident of New Castle, in the county of Lawrence and State of Pennsylvania, have invented a new and useful Improvement in Brake-Beam Supports; and I do hereby declare the following to be a full, clear, and exact description thereof.

My invention relates to a brake-beam support, its object being to provide for the support of the brake-beam so that it will be supported continuously in a horizontal position and to prevent the dragging of the shoes on the wheels at either their top or bottom ends, thereby securing an even wear of the brake-shoes.

To these ends my invention comprises the novel features hreinafter set forth and claimed.

In the drawings Figure 1 is a side elevation partly in section of the truck embodying my invention; Fig. 2 is an enlarged portion of the truck partly in section; and Figs. 3 and 4 are enlarged details.

In the drawings I have illustrated my invention in connection with a good form of truck consisting of the side frames 2, the equalizer-bars 3, the axle 4, the wheels 5, the bolster 6 and all combine to form said truck. As my invention, however, relates to the brake hanging mechanism, I will confine the description specifically to said construction.

The brake-hanger brackets 7 are held between the equalizer-bars 3 and are secured in place by means of the bolts 7'. In order to permit of the adjustment of the brackets 7 in a direction toward the axle to compensate for the reduction in the diameter in the wheels due to wear, I provide said brackets with the slotted openings 8.

Pivotally secured to the upper ends of the brake-hanger brackets 7 by the bolts 10 are the hangers 9. The lower ends of the hangers 9 are connected by bolts 12 to the bracket 13 and said bracket 13 is secured to the brake-beam 14 by the bolts 15. The brake-head 16 is secured to the brake-beam 14 by the bolts 17.

By having the brake hanger bracket 7 adjustable in the manner above set forth, the hangers 9 can be kept from swinging too far out of a vertical line when the diameter of the wheels is reduced by wear and the further movement of the hanger is required to apply the brakes.

The brake-beam 14 which may be formed of a rolled Z-bar carries the fulcrums 18 and secured to said fulcrum by means of bolts 19 are the live and dead levers 20 and 21. The lower ends of the live and dead levers 20 and 21 are connected by the adjustable brake-rod 22. The brake-shoe 23 is supported in the brake-head in the ordinary manner.

I find it very desirable to support the brake-beam 14 and the parts carried thereby by the hanger bolt 12 in the position shown which is approximately in line across the truck with the center of the brake-shoe, as an even wear of the brake-shoe is secured. The whole brake-beam 14 is located on one side of the bolt 12 so that it is eccentrically attached to the hangers, and the beam is much heavier than the levers 20 and 21 on the other side of the bolt 12 so that the weight of the beam causes it to swing down on its hanger bolts 12 and this swinging down of the beam causes the bottom end of the shoe 23 to drag on the wheel, thereby causing unnecessary wear and retarding the movement of the car. To obviate this I provide the spring 24 which is located in the pocket 25 in the brake-hanger bracket 7, so that said spring will have to follow the bracket when the bracket is adjusted to different positions in the slots 8. The spring 24 is provided with a cap 26 which is in sliding contact with the under side of the brake-beam 14 and the back flange of the brake-beam is cut away at 27 to clear the spring-cap 26 as the beam moves forward. The spring 24 is made just strong enough to equal the eccentric weight of the beam at a point at the center of the spring with the spring in the position shown, which is the position the beam occupies when both the wheels and shoes are new. As the shoes wear away, the hangers 9 swing farther out of a vertical line and thereby lift the beam and the spring 24 expands as said beam is lifted up. But as the spring expands, it becomes weaker and will support a smaller load. Furthermore as the shoe wears out the beam 14 slides on the cap 26 and the beam is thus supported by the spring 24 at a point farther away from the bolt 12. The moving of the spring support away from the bolt 12 gives the spring 24 a greater leverage to overcome the eccentric weight of the beam so that as the beam slides toward the wheel the required strength of the spring to support the beam in a horizontal position becomes less. In this manner, by the action of lifting and sliding of the beam the strength of the spring is varied to suit the varying eccentric weights of the beam and thus the beam is supported continuously in a horizontal position and the dragging of the shoes on the wheels at their top or bottom is prevented. To assist this action, the brake-hanger bolts 12 are provided with very stiff springs 28 which, by clamping the hanger ends against the bracket 13, overcome resistance to the swinging or rotation of the beam on the bolts 12. If the shoes wear unevenly, for instance, if they should wear faster at the top than at the bottom, the beam will be rotated up and when the shoe is released from the wheel, the spring 24 having expanded, will be a trifle too weak to hold the beam up in its tilted position, but the heavy friction produced by the springs 28 will assist the springs 24 sufficiently to hold the beam in the tilted position necessary to prevent the shoes from dragging on the wheels. And the same action takes place when the shoes wear fastest at their bottom ends.

What I claim is:

1. The combination with a suitable truck, of wheels, swinging brake-hangers, a brake-beam eccentrically supported by said hangers, and a spring bearing against the lower face of said brake-beam.

2. The combination with a suitable truck, of wheels, swinging brake-hangers, a brake-beam eccentrically supported by said hangers, and a compression spring engaging the lower face of said brake-beam.

3. The combination of a suitable brake, of wheels, swinging brake-hangers, a brake-beam eccentrically supported by said hangers, and a compression spring in sliding contact with the under side of said brake-beam and supporting the same.

4. The combination of a suitable truck, of wheels, swinging brake-hangers, a brake-beam eccentrically supported by said hangers, and compression springs, said beams having a sliding support on said springs.

5. The combination with a suitable truck, of wheels, a brake-beam and compression springs, said brake-beam having a sliding support on said compression spring.

6. The combination with a suitable truck, of wheels, swinging brake-hangers, a brake-beam eccentrically supported by said hangers, springs giving a sliding support to a part of the weight of the brake-beam, means for raising said beams by the swinging of said hangers, whereby the said springs are elongated and their carrying capacity reduced to compensate for the decreased load on the spring.

7. The combination of a suitable truck, of wheels, equalizer-bars, brake-hanger brackets supported by the equalizer bars, swinging brake-hangers, brake beams eccentrically supported by said hangers, and compression springs carried by the brake-hanger brackets and supporting said brake-beam.

8. The combination with a suitable truck, of wheels, equalizer-bars, brake-hanger brackets adjustably attached to the equalizer-bars, swinging brake-hangers, a brake-beam eccentrically supported by said hangers, and compression springs carried by the brake-hanger brackets, said brake-beam having a sliding support on said compression springs.

9. The combination with a suitable truck, of wheels, friction type swinging brake-hangers, a brake-beam, helical springs, said brake-beam being held in proper position by the friction of the brake-hangers in conjunction with said helical springs.

10. The combination with a suitable truck, of wheels, brake-hanger brackets, swinging brake-hangers having friction producing springs at their pivots, a brake-beam eccentrically supported by their brake-hangers, and a helical spring supporting said brake-beam, the eccentric load of said beam supported by the helical springs in conjunction with the friction at the pivots of the brake-hangers.

11. The combination with a suitable truck, of wheels, equalizer-bars, brake-rigging and springs attached to said equalizer-bars, said brake-rigging being partially supported on said springs.

12. The combination with a suitable truck, of wheels, equalizer-bars, swinging brake-hangers, brake-rigging and springs attached to the equalizer-bars, said brake-hangers and springs combining to support said brake-rigging.

In testimony whereof, I the said WILLIAM GUNN PRICE have hereunto set my hand.

WILLIAM GUNN PRICE.

Witnesses:
 ROBERT C. TOTTEN,
 JOHN F. WILL.

Copies of this patent may be obtained for five cents each, by addressing the "Commissioner of Patents. Washington, D. C."